(12) United States Patent
Roka

(10) Patent No.: US 8,849,322 B2
(45) Date of Patent: Sep. 30, 2014

(54) SYSTEMS AND METHODS FOR SHARING THREADED CONVERSATIONS ON MOBILE COMMUNICATIONS DEVICES

(75) Inventor: Pujan K. Roka, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 1024 days.

(21) Appl. No.: 12/901,788

(22) Filed: Oct. 11, 2010

(65) Prior Publication Data

US 2012/0088527 A1    Apr. 12, 2012

(51) Int. Cl.
*H04W 4/00* (2009.01)
*H04W 4/12* (2009.01)
*H04L 12/58* (2006.01)

(52) U.S. Cl.
CPC .............. *H04W 4/12* (2013.01); *H04L 51/16* (2013.01); *H04L 12/586* (2013.01); *H04L 51/14* (2013.01); *H04L 12/5855* (2013.01)
USPC ........... 455/466; 455/463; 715/206; 715/751; 715/756

(58) Field of Classification Search
CPC ........... H04W 4/12; H04W 4/14; H04W 4/16; H04W 88/184; H04W 8/18; H04W 88/02; H04L 41/509; H04L 12/5895; H04L 51/16; H04L 12/586; H04L 51/04; H04L 51/14; H04L 51/36; H04M 3/51; H04M 3/42187; H04M 1/72552; H04M 2207/18; H04M 15/7652; H04M 3/42008
USPC ................... 455/466, 463; 715/206, 751, 756
See application file for complete search history.

(56) References Cited

U.S. PATENT DOCUMENTS

| | | | |
|---|---|---|---|
| 6,856,809 B2 | 2/2005 | Fostick | |
| 7,218,943 B2 | 5/2007 | Klassen et al. | |
| 7,519,381 B2 | 4/2009 | Klassen et al. | |
| 7,558,586 B2 | 7/2009 | Klassen et al. | |
| 7,620,407 B1 | 11/2009 | Donald et al. | |
| 2004/0243674 A1 | 12/2004 | Lu | |
| 2007/0054678 A1 | 3/2007 | Doulton | |
| 2007/0094111 A1 | 4/2007 | Carrion | |
| 2008/0123686 A1 | 5/2008 | Lee et al. | |
| 2008/0144784 A1* | 6/2008 | Limberg | 379/88.14 |
| 2008/0243619 A1* | 10/2008 | Sharman et al. | 705/14 |
| 2009/0106366 A1 | 4/2009 | Virtanen et al. | |
| 2009/0176521 A1 | 7/2009 | Klassen et al. | |
| 2010/0048231 A1 | 2/2010 | Donald et al. | |
| 2010/0056187 A1 | 3/2010 | Abuelsaad et al. | |
| 2010/0087172 A1 | 4/2010 | Klassen et al. | |
| 2010/0158214 A1 | 6/2010 | Gravino et al. | |
| 2010/0167700 A1 | 7/2010 | Brock et al. | |
| 2010/0210292 A1* | 8/2010 | Nooren | 455/466 |

* cited by examiner

*Primary Examiner* — Nimesh Patel
(74) *Attorney, Agent, or Firm* — Sutherland Asbill & Brennan LLP

(57) ABSTRACT

Embodiments of the invention may include systems and methods for sharing threaded conversations on mobile communications devices. In one embodiment, a method may include: receiving, at a service provider system, a message containing a thread file associated with a forwarded message thread from a forwarding party mobile communications device, wherein the thread file comprises message text and sender information obtained from each of multiple text messages in the forwarded message thread, and wherein the message identifies at least one new recipient; identifying the message as containing a thread file; generating and associating a unique thread identifier with the thread file; and transmitting the thread file with the unique thread identifier over a wireless network for delivery to the at least one new recipient for display of the forwarded message thread.

20 Claims, 8 Drawing Sheets

SYSTEMS AND METHODS FOR SHARING THREADED CONVERSATIONS ON MOBILE COMMUNICATIONS DEVICES

FIELD OF THE INVENTION

Aspects of the invention relate generally to wireless messaging, and more particularly, to systems and methods for sharing threaded conversations on mobile communications devices.

BACKGROUND OF THE INVENTION

Many mobile communications devices (e.g., cellular phones, smart phones, etc.) are capable of sending and receiving Short Message Service ("SMS") messages or other text-based messages. Mobile communications devices ("MCD") have also begun grouping multiple messages together for display on a single screen which represent a conversation between two people. A grouping is typically referred to as a message thread or a conversation thread. For example, all messages between the user's device and another device that occur over a predefined period of time may be grouped as a single thread for display together to the user.

Conventional devices, however, are limited to displaying conversations between only two people and not more. In addition, there currently exists no means for forwarding an entire message thread to a new person or device. Some devices allow forwarding a single text-based message to another person, but not multiple grouped messages. Therefore, a need exists for systems and methods that allow sharing threaded conversations on mobile communications devices.

BRIEF DESCRIPTION OF THE INVENTION

Some or all of the above needs and/or problems may be addressed by certain embodiments of the invention. Embodiments of the invention may include systems and methods for sharing threaded conversations on mobile communications devices. In one embodiment, a method for forwarding a message thread from a mobile communications device is provided. The method may include: displaying multiple text messages between at least two thread participants on a forwarding party mobile communications device display as a message thread; receiving an instruction to forward the message thread to at least one new recipient mobile communications device; obtaining message text and sender information for each of the multiple text messages in the message thread; generating a thread file including the obtained message text and sender information for each of the multiple text messages in the message thread; and transmitting the thread file for delivery from the forwarding party mobile communications device to the at least one new recipient mobile communications device for display of the message thread.

According to another embodiment, a method for receiving a forwarded message thread at a mobile communications device is provided. The method may include: receiving, at a new recipient mobile communications device, a message associated with a thread file, wherein the thread file comprises message text and sender information obtained from each of the multiple text messages in a forwarded message thread forwarded from a forwarding mobile communications device; obtaining the thread file and obtaining the message text and sender information for each of the multiple text messages from the thread file; generating the forwarded message thread containing the obtained message text and sender information for each of the multiple text messages; and displaying the forwarded message thread on a display of the new recipient mobile communications device, wherein the forwarded message thread comprises a text message for each of the multiple text messages in the forwarded message thread.

According to another embodiment, a method for forwarding a message thread between mobile communications devices is provided. The method may include: receiving, at a service provider system, a message containing a thread file associated with a forwarded message thread from a forwarding party mobile communications device, wherein the thread file comprises message text and sender information obtained from each of the multiple text messages in the forwarded message thread, and wherein the message identifies at least one new recipient; identifying the message as containing a thread file; generating and associating a unique thread identifier with the thread file; and transmitting the thread file with the unique thread identifier over a wireless network for delivery to the at least one new recipient for display of the forwarded message thread.

According to yet another embodiment, a system for forwarding a message thread between mobile communications devices is provided. The system can include: a wireless operator system having at least one memory storing computer-executable instructions and at least one processor operable to execute the computer-executable instructions. The processor may be operable to execute the computer-executable instructions to: receive a message containing a thread file associated with a forwarded message thread from a forwarding party mobile communications device, wherein the thread file comprises message text and sender information obtained from each of multiple text messages in the forwarded message thread, and wherein the message identifies at least one new recipient; identify the message as containing a thread file; generate and associate a unique thread identifier with the thread file; and transmit the thread file with the unique thread identifier over a wireless network for delivery to the at least one new recipient for display of the forwarded message thread.

According to yet another embodiment, a mobile communications device for forwarding a message thread is provided. The device may include computer-executable instructions and at least one processor operable for executing the computer-executable instructions to: display multiple text messages between at least two thread participants on the mobile communications device display as a message thread; receive an instruction to forward the message thread to at least one new recipient mobile communications device; obtain message text and sender information for each of the text messages in the message thread; generate a thread file including the obtained message text and sender information for each of the text messages in the message thread; and transmit the thread file for delivery to the at least one new recipient mobile communications device for display of the message thread.

According to yet another embodiment, a mobile communications device for receiving and displaying a forwarded message thread is provided. The device may include computer-executable instructions and at least one processor operable for executing the computer-executable instructions to: receive a message associated with a thread file, wherein the thread file comprises message text and sender information obtained from each of multiple text messages in a forwarded message thread forwarded from a forwarding mobile communications device; obtain the thread file and obtain the message text and sender information for each of the text messages from the thread file; generate the forwarded message thread containing the obtained message text and sender information for each of the text messages; and display the forwarded message thread on a display of the mobile communications device, wherein the forwarded message thread comprises a text message for each of the text messages in the forwarded message thread.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
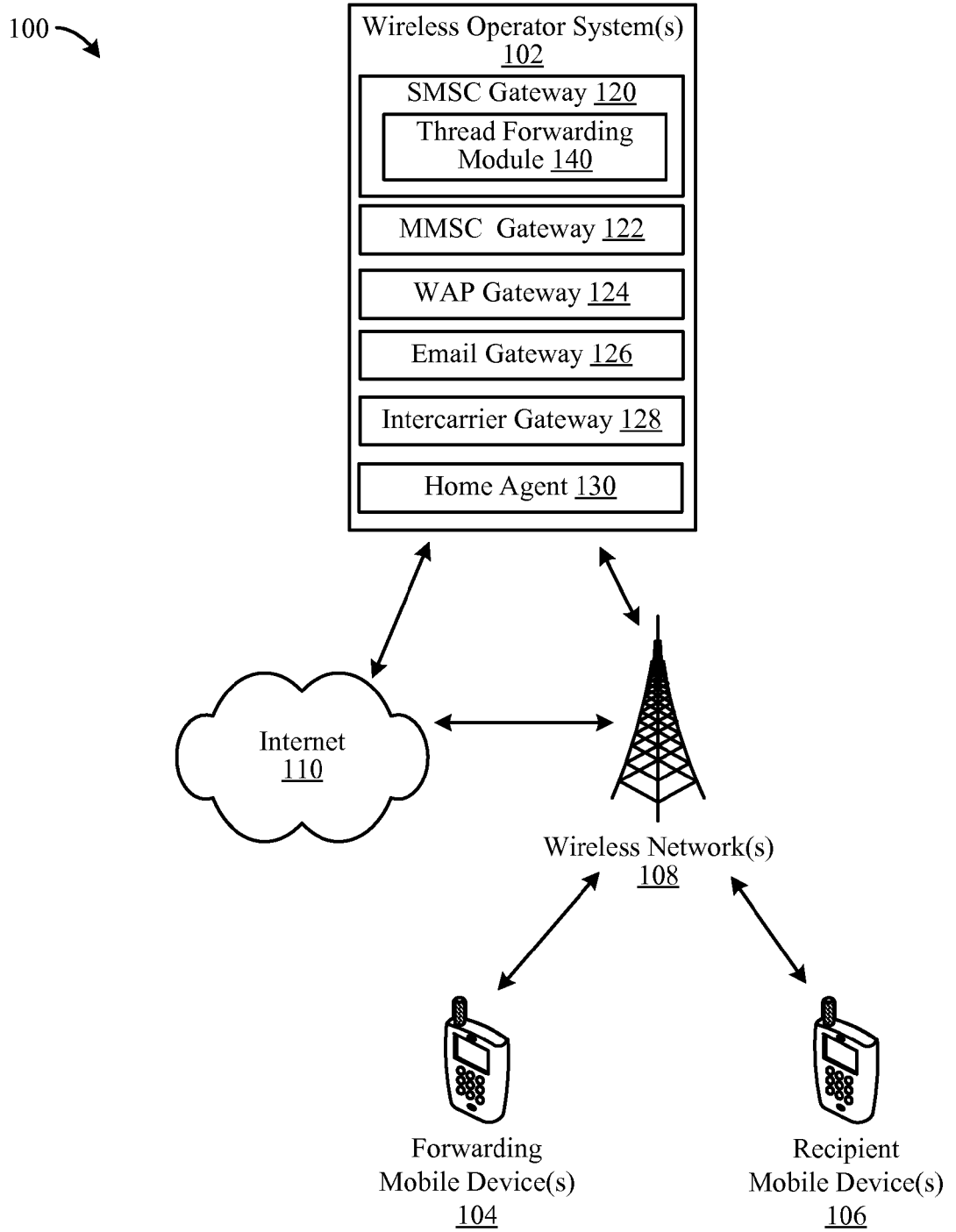
FIG. 1 illustrates an example system, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for sharing threaded messages with other mobile communications devices. As discussed, many mobile communications devices (e.g., a mobile phone, a smart phone, a pager, a tablet computer, a media player, etc.) generate a single view (referred to herein as "threaded view" or "conversation view") that displays multiple text-based messages (e.g., SMS messages) between two recipients such that users can see a thread of the past messages shared between the two recipients. However, conventional threaded or conversation views are limited to displaying messages between two users, and do not have the ability to forward the multiple messages of the thread to one or more new recipients, optionally inviting them to participate in the threaded conversation. According to the embodiments described herein, these systems and methods provide the ability to forward a message thread to a new mobile communications device recipient not yet participating in the conversation. Moreover, upon the new recipient's device receiving the forwarded message thread, the new recipient can view the entire conversation between the two original thread participants, as well as, optionally, reply to one, some, or all of the thread participants, thus joining the conversation thread.

According to one embodiment, an SMS client on a user's (the forwarding party's) MCD allows generating a thread file (also generally referred to herein as a "flat thread file," but not limited to a "flat" file structure) that contains the message text and sender information from the message thread to be forwarded. This flat thread file can then be forwarded to the intended forward recipients. SMS messaging, Multimedia Message Service ("MMS") messaging, or mobile email applications can be utilized to forward the flat thread file containing the forwarded message thread details via the wireless operator system to the recipient MCD(s).

Depending upon the technique utilized to forward the flat thread, the recipient mobile device may receive the flat thread file differently. For example, if the flat thread file is transmitted by the forwarding party using SMS, the wireless operator system may first transmit a forwarded thread message availability notification to the recipient party's MCD, receipt of which causes the SMS client on the recipient party's MCD to retrieve the flat thread file stored at the wireless operator system over a network (e.g., via an hyper text transmission protocol ("HTTP") session). If the flat thread file is forwarded via MMS messaging, then the wireless operator system may first transmit an MMS control message containing a location identifier to the flat thread file stored at the wireless operator system. Otherwise, if the flat thread file is transmitted via mobile email (e.g., as an attachment or in the body), then the SMS client and/or email client of the recipient party's MCD may include processing logic to identify the email as containing the flat thread file and extract the flat thread file therefrom.

Upon receiving the flat thread file, whether by SMS, MMS, or mobile email, the SMS client on the recipient's MCD then parses the flat thread file to display the message text and the sender information as a threaded conversation on the new recipient's MCD. Also as part of forwarding the message thread, the wireless operator system (or any of the MCDs) can generate a unique thread identifier, which will allow identifying and associating subsequent messages with the forwarded message thread, and/or create a new forwarded message thread from the originally forwarded message thread, such as processing replies or subsequent forwards by one or more of the parties.

More details regarding the various means for implementing the embodiments of the invention are provided below with reference to FIGS. 1-7.

System Overview

An example system 100 will now be described illustratively with respect to FIG. 1. The system 100 may include one or more network operators and associated wireless operator systems 102, at least one forwarding mobile communications device ("MCD") 104, at least one recipient MCD 106, one or more wireless networks 108, and one or more other networks (e.g., the Internet, wide area network, local area network, private network, public network, etc., generally referred to herein as the "Internet") 112. Each of the aforementioned systems or system components is configured for accessing and reading associated computer-readable media having data stored thereon and/or computer-executable instructions for implementing the various methods described herein. By executing computer-executable instructions, each of these computer systems may form a special purpose computer or a particular machine. As used herein, the term "computer-readable medium" may describe any form of computer memory or memory device.

The wireless operator system 102 may be one or more wireless operator systems 102, each associated with one or more suitable processor-driven devices that facilitate the transmission of text-based messages, as well as other wireless communications between MCDs, such as, but not limited to, a server computer, a mainframe computer, one or more networked computers, a desktop computer, a personal computer, an application specific circuit, microcontroller, minicomputer, or any other processor-based device. The execution of suitable computer-implemented instructions by the wireless operator system 102 may form a special purpose computer or other particular machine that is operable to facilitate forwarding message threads, as discussed herein. Although a single wireless operator system 102 is described herein, the operations and/or control of the wireless operator system 102 may be distributed amongst any number of computers and/or processing components. Moreover, in some instances, the operations described herein may be performed by multiple wireless operator systems 102, such as if different wireless operators are involved in the transmission of the text-based messages.

Details of the wireless operator system 102 are described with reference to FIG. 2, which illustrates a schematic view of an example computer system, according to one embodiment. The wireless operator system 102 thus includes one or more processors 225, one or more memory device(s) 205, one or more input/output ("I/O") interface(s) 240, and one or more network interface(s) 245, communicating over a data communications bus 230. The memory device 205 may be any suitable memory device, for example, caches, read only memory devices, random access memory devices, magnetic storage devices, removable storage devices, etc. Additionally, any number of logical data storage constructs may be stored as desired within the memory device 205, such as any number of suitable databases. The memory device 205 may further store a wide variety of data 215, such as message thread information, unique thread identifications, flat thread files, sender and recipient information, and the like. Additionally, the memory device 205 may store executable programmed logic instructions 210 and/or various program modules utilized by the wireless operator system 102, for example, an operating system 220, a Short Message Service Center ("SMSC") Gateway, a Multimedia Message Service Center ("MMSC") Gateway, a Wireless Application Protocol ("WAP") Gateway, an Email Gateway, an Intercarrier Gateway, a Home Agent, and a thread forwarding module, such as are described in more detail herein. The operating system 220 may be a suitable software module that controls the general operation of the wireless operator system 102, and may also facilitate the execution of other programmed logic 210 by the one or more processors 225, for example, the thread forwarding module. The operating system 220 may be, but is not limited to, Microsoft Windows®, Apple OSXTM, Linux, Unix, or a mainframe operating system.

With continued reference to the wireless operator system 102, the one or more I/O interfaces 240 may facilitate communication between the wireless operator system 102 and one or more input/output devices, for example, one or more user interface devices, such as a display, keypad, mouse, pointing device, control panel, touch screen display, remote control, microphone, speaker, etc. that facilitate user interaction with the wireless operator system 102. The one or more network interfaces 245 may facilitate connection of the wireless operator system 102 to one or more suitable networks, for example, the Internet 110 and/or the wireless network 108 illustrated in FIG. 1. In this regard, the wireless operator system 102 may receive and/or communicate information to other components of the system 100, such as the MCDs 104, 106, other wireless operator systems 102, and/or other components conventionally associated with wireless communications networks.

As illustrated in FIG. 1, the wireless operator system 102 includes a number of programmed logic modules, including, but not limited to, an SMSC Gateway 120, an MMSC Gateway 122, a WAP Gateway 124, an Email Gateway 126, an Intercarrier Gateway 128, and a Home Agent 130 each adapted to facilitate wireless communications, as is conventionally known. Briefly, the SMSC Gateway 120 may be adapted for receiving and processing SMS messages from subscriber MCDs and from other wireless operators (e.g., via an Intercarrier Gateway 128). As part of the SMSC Gateway 120 operations, a received SMS message may be initially stored at the wireless operator system 102, and subsequently sent to the intended recipient(s) when they are available (commonly referred to as "store and forward handling"). The MMSC Gateway 122 operates in a similar manner, but when sending the MMS message to the intended recipient(s), an MMS control message is first sent to the recipient MCD device(s) when available (e.g., as an SMS message), which includes a link (e.g., a uniform resource identifier ("URI") or a uniform resource locator ("URL")). Upon receipt of the MMS control message, the MCD initiates an HTTP session (e.g., via the MCD's WAP module) to retrieve the MMS message identified by the link (the URI or URL). A WAP Gateway 124 is generally utilized for handling WAP communications from MCDs, such as for handling requests to access web-based pages and/or requests for files, and for translating text-based messages/requests into HTTP-based requests. An Email Gateway 126 is generally utilized to handle email messages transmitted to/from MCDs. An Intercarrier Gateway 128 is utilized to exchange messages between wireless operator systems 102, such as if a recipient is a subscriber of a different wireless operator than the sending party. A Home Agent 130 is utilized to maintain an IP address (or other routing identifier) for subscriber's MCDs regardless of their actual location. Each of these modules will be discussed in more detail below with reference to the various embodiments for forwarding text-based message threads. It is appreciated that the aforementioned features of an MCD 104, 106 are provided for illustrative purposes and are not intended to be limiting.

The MCDs 104, 106 are operable for communication over one or more wireless networks 108. An MCD 104, 106 may be any device operable for wireless communications (e.g., cellular, Wi-Fi Internet communications, WiMAX network communications, and the like), such as, but not limited to, a mobile phone, a pager device, a smart phone, a personal audio player, a personal device assistant, a personal computer, a laptop computer, a tablet computer, a media player, or any other suitable portable device operable for wireless communications. Accordingly, each MCD 104, 106 is associated with a wireless operator system 102 (also referred to as a "subscriber" of the wireless operator), and communicates at least partially over the wireless network(s) 108 operated by the wireless operator system 102. When MCDs 104, 106 that subscribe to one wireless operator system 102 are communicating with MCDs 104, 106 that subscribe to another wireless operator system 102, then, typically, communications are transmitted between the MCDs 104, 106 over both respective wireless networks 108, such as is facilitated by the Intercarrier Gateways 128 of the wireless operator systems 102.

Details of the MCDs 104, 106 are described with reference to FIG. 3, which illustrates a schematic view of an example MCD 104, 106, according to one embodiment. Each MCD 104, 106 includes a memory 305, a processor 325, a transceiver 355, and a Subscriber Identity Module ("SIM") card 360 (or any other means to uniquely store and identify the user/subscriber of the MCD), each in communication over one or more data communications buses 330. The memory 305 may be any suitable memory device, for example, caches, read only memory devices, random access memory devices, magnetic storage devices, removable storage devices, etc., and may be operable to store programmed logic 310, data 315, and an operating system 320. According to one example, the programmed logic 310 may include an SMS (and/or MMS or mobile email) client and a thread forwarding module, such as may be programmed to implement the message thread forwarding features described in more detail herein. The processor 325 (or processors) may be operable to execute the programmed logic 310 and the operating system 320, and may be any microprocessor, microcontroller, or any other processing device. The transceiver 355 is operable for receiving and transmitting wireless signals, such as may be used for carrying voice and/or data (e.g., voice calls, SMS messages, MMS messages, mobile email, etc.). Example wireless transceivers 355 include, but are not limited to, radio frequency transceivers, IEEE 802.11-type (also referred to as Wi-Fi), Bluetooth, infrared, and the like. In addition, an input/output ("I/O") controller 340 is operable to facilitate control of input and output to and from the MCD 104, 106 user, via the display 340 and the keypad 350, and, optionally, via other interface devices. The I/O controller 340 can thus be implemented in hardware, software, firmware, or any other combination thereof, and may include interface drivers, buffers, or interrupts to handle the input and output of audio, video, data, graphics, etc. The display 345 may be any display for displaying graphics, video, text, etc. on the MCD 104, 106, such as, but not limited to, the screen (e.g., LCD), touchscreen, monitor, and/or other display. The keypad/entry component 350 may be any input device, such as, but not limited to, conventional phone-type keypad (e.g., 0-9 plus characters), QWERTY keypad, touchscreen interface, graffiti interface, and/or any other input device. It is appreciated that the aforementioned features of an MCD 104, 106 are provided for illustrative purposes and are not intended to be limiting.

The wireless network 108 may be any wireless network operable for wireless communications operating under any cellular or other wireless network protocol (e.g., GSM, CDMA, TDMA, etc.). In addition, the wireless network 108 may provide MCDs 104, 106 wireless access to the Internet 110, for example, to access the world wide web or to utilize HTTP communications sessions, such as when retrieving MMS messages and/or mobile emails. Due to network connectivity, various methodologies described herein may be practiced in the context of distributed computing environments. Although the system 100 is shown for simplicity as including one intervening wireless network 108 and Internet 110, it is to be understood that any other network configuration is possible, which may optionally include a plurality of networks, each with devices such as gateways and routers, for providing connectivity between or among networks.

Figure 2:
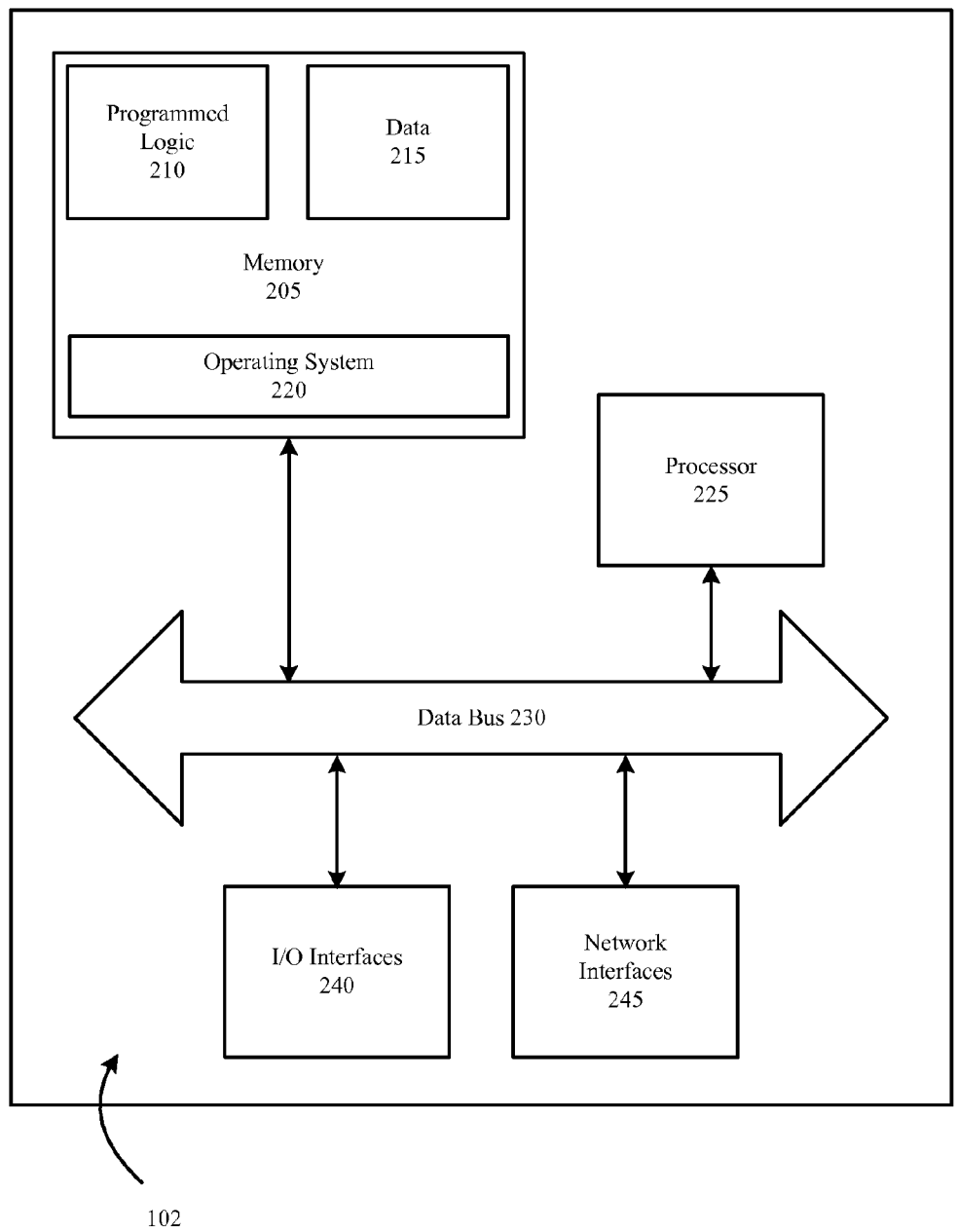
FIG. 2 is a schematic diagram of an example computer system, according to an example embodiment of the invention.
Figure 3:
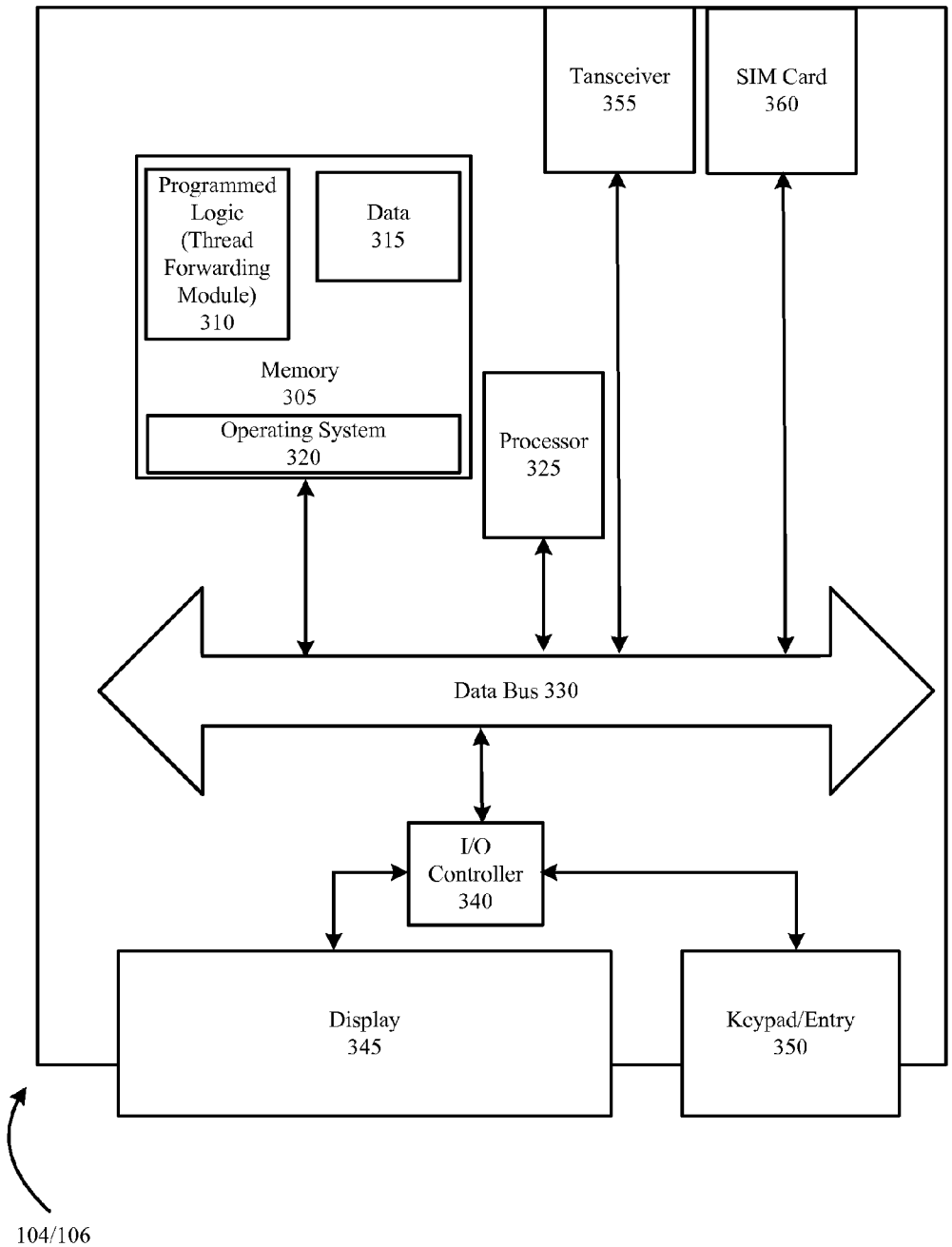
FIG. 3 is a schematic diagram of an example mobile communications device, according to an example embodiment of the invention.

The system 100 shown in and described with respect to FIGS. 1-3 is provided by way of example only. Numerous other operating environments, system architectures, and device configurations are possible. Accordingly, embodiments of the invention should not be construed as being limited to any particular operating environment, system architecture, or device configuration.

Operational Overview

Figure 4A:
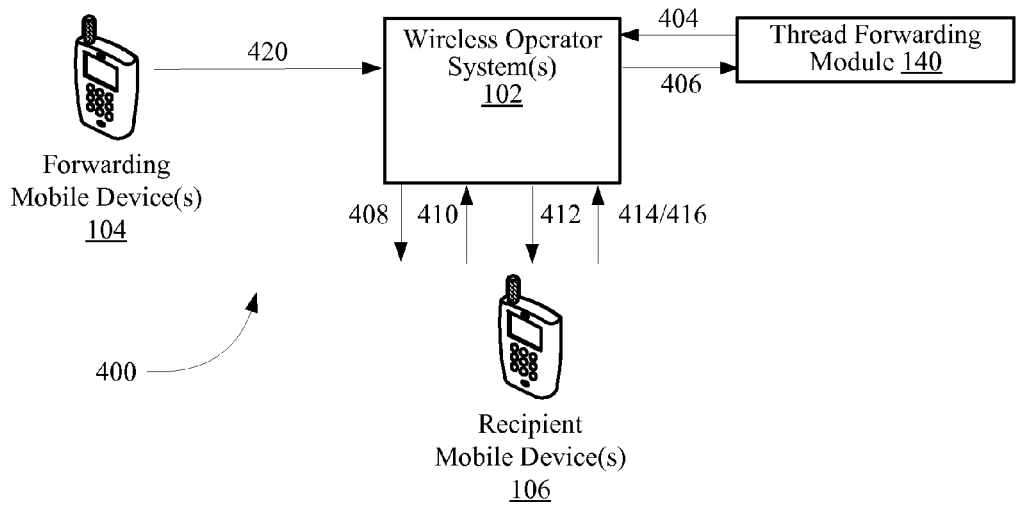
FIGS. 4A-4C illustrate block diagrams depicting example uses of a system, according to an example embodiment of the invention.
Figure 4B:
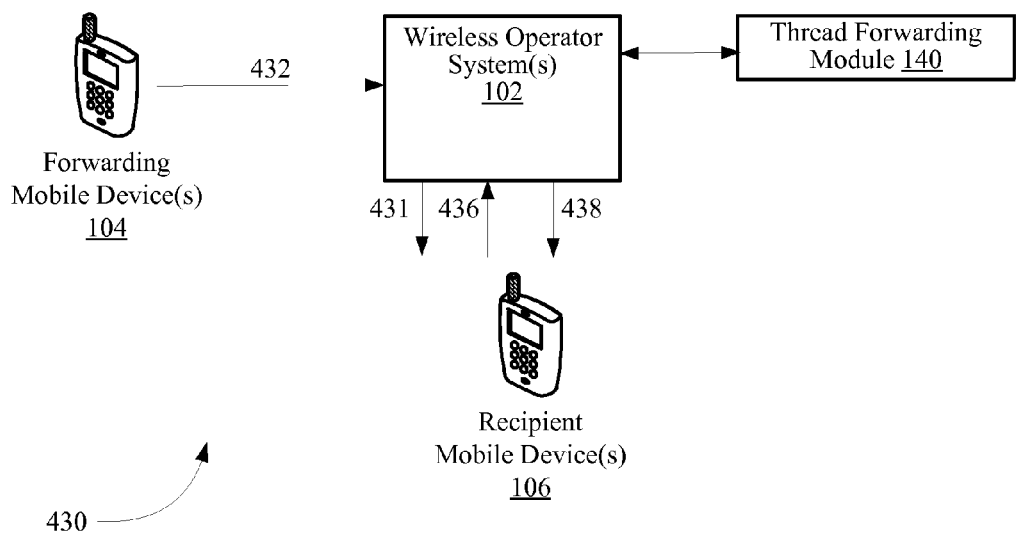
Figure 4C:
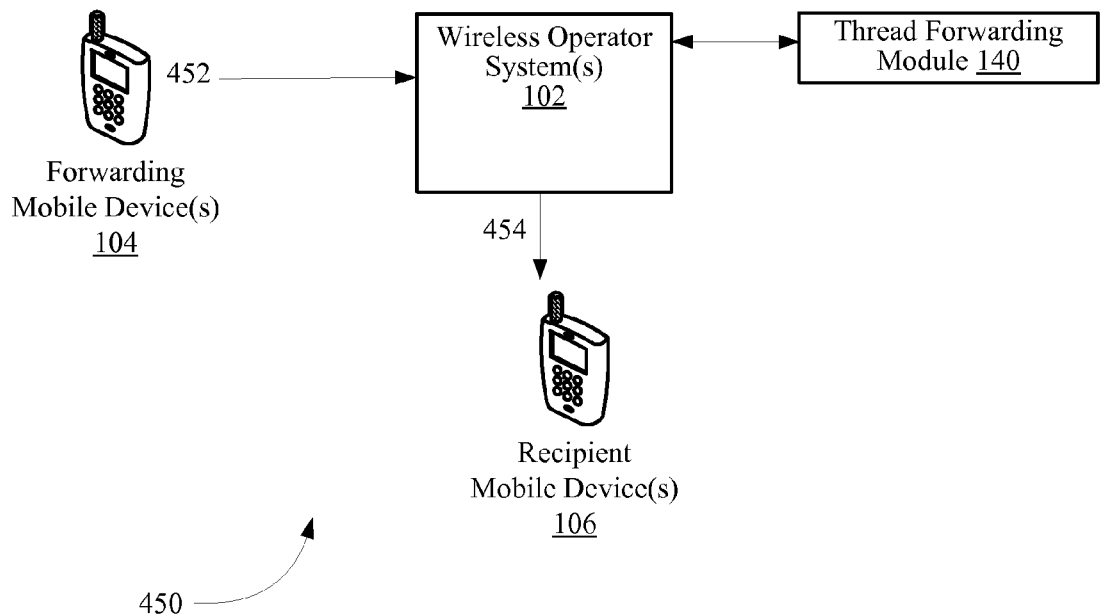

FIGS. 4A-4C are block diagrams illustrating example operational flow for forwarding message threads and, optionally, replying thereto, according to various embodiments described herein. FIG. 4A illustrates an example operational flow 400 when utilizing SMS messages to forward a text-based message thread to a new MCD. FIG. 4B illustrates an operational flow 430 utilizing MMS messages to forward a text-based message thread. FIG. 4C illustrates an operational flow 450 for forwarding a message thread to a new MCD via mobile email. For simplicity, each of these examples are described with reference to a forwarding MCD 104, a recipient MCD 106, a wireless operator system 102, and a thread forwarding module 140 of the wireless operator system 102. It is appreciated, however, that, in some embodiments, additional system and/or network components are utilized. For example, one or more of the various modules of the wireless operator system 102 described with reference to FIG. 1 may be utilized, depending upon the technique for forwarding the message thread. In addition, one or more wireless networks 108 and the Internet 110 (or other network) are also utilized for communications between the MCDs 104, 106 and the wireless operator system or systems 102. Additional details of these operations are also described with reference to the methods illustrated by FIGS. 5-7.

FIG. 4A is a block diagram illustrating an example operational flow 400 and operations of forwarding a message thread from a forwarding MCD 104 to a recipient MCD 106 utilizing SMS messaging protocol. An SMS message thread may first be generated by the MCD 104 according to any number of conventional thread definition techniques, including, but not limited to, grouping a number of SMS messages between two thread participants based on message participants and timing associated with the message, grouping based on participant only, grouping based on the inclusion or association with a unique identifier, and the like. As also described with reference to FIG. 5, a forwarding MCD 104 that is one of two thread participants of an SMS message thread may decide to forward the message thread to a new recipient who has not yet participated in the conversation (given that typical message threads are conventionally created between two participants). Thus, upon receiving a command issued by the user to forward the message thread to one or more recipients, the SMS client (or other programmed logic operable to implement thread forwarding module) of the forwarding MCD 104 generates a flat thread file that contains the message text for each of the individual messages of the message thread and sender identifiers for each of the messages (e.g., a name, a number, a nickname, etc.). The flat thread file allows capturing the thread content containing multiple individual SMS messages in a single file. Any number of file formats for creating the flat thread file 402 can be utilized, such as, but not limited to, text files, comma separated files, extensible mark-up ("XML") files, wireless mark-up ("WML") files, and the like. After generating the flat thread file and providing the recipient(s) identifier(s), the forwarding MCD 104 transmits the flat thread file 402 to the wireless operator system 102 over the wireless network as an SMS message, for delivery to each of the identified recipient MCD(s) 106.

According to various embodiments, any number of recipients may be identified. A recipient may be selected from a list, from contact date, or entered directly. In addition, in one embodiment, the forwarding user may select a subset of messages to forward, such as if not all individual messages of the current message thread are desired to be forwarded. A user interface may be provided that allows selecting one, some, or all of the individual messages in the original message thread (e.g., check box, highlighting, etc.), or the messages to be excluded. The flat thread file 402 that is generated will reflect the selected messages such that, when executed by the recipient MCD 106, the forwarded message thread will only display those selected by the user. It is appreciated, however, that in other embodiments all of the individual messages in the message thread are forwarded (either by default or by limitation, for example).

Upon receipt of the SMS message containing the flat thread file 402, as described in more detail with reference to FIG. 6, the wireless operator system 102, such as via thread forwarding module 140 or any other programmed logic, identifies the message as having a flat thread file 402, stores 404 the flat thread file 402 (at least temporarily), and, optionally, generates a unique thread identifier 406 (also referred to herein as a "conversation ID") and associates the identifier 406 with the flat thread file 402 containing the forwarded message thread. The unique thread identifier 406 may be utilized to subsequently group replies, forwards, new messages, etc. to allow creating or continuing the conversation thread. The wireless operator system 102 then transmits a message thread availability notification 408 to the recipient MCD 106, notifying the MCD 106 that a flat thread file is available for retrieval. As discussed in more detail below, this message thread availability notification 408 may be a silent notification, which will cause the SMS client (or other programmed logic operable to implement thread forwarding module) of the recipient MCD 106 to identify that a flat thread file 402 containing a forwarded message thread is available for retrieval. In another embodiment, the message thread availability notification 408 may be a visible message (e.g., an SMS or MMS message) that indicates to the user that a flat thread file 402 containing a forwarded message thread is available for retrieval and requires user input to retrieve the flat thread file (e.g., hyperlink, accept command, etc.). The message thread availability notification 408 may be transmitted as an SMS message, a WAP push message, an MMS message, and the like.

According to one embodiment, the SMSC Gateway 120 of the wireless operator system 102, as described with reference to FIG. 1, may be operable to receive and transmit SMS messages between the forwarding MCD 104 and the recipient MCD 106. If the two MCDs 104, 106 are subscribers of different wireless operators, then the Intercarrier Gateway 128, also described with reference to FIG. 1, may be operable to facilitate exchanging the SMS messages and/or flat thread files (or any other message types, such as MMS messages and mobile email messages described with reference to FIGS. 4B-4C, respectively) between the wireless operator systems 102 for communication over the different wireless networks 108. In one embodiment, the SMSC Gateway 120 may be modified or otherwise include the programmed logic, such as a thread forwarding module 140, to perform, at least in part, the thread forwarding operations performed by the wireless operator system 102. It is appreciated, however, that these system components and modules are provided for illustrative purposes and are not intended to be limiting.

In response to the message thread availability notification 408, also discussed with reference to FIG. 7, the recipient MCD 106, such as via the SMS client (or MMS client, etc.), initiates an HTTP session 410 with the wireless operator system 102 over the Internet 110 via the wireless network 108 to download the flat thread file 402. The flat thread file 402, which contains the unique thread identifier 406 if generated, is then downloaded 412 to the recipient MCD 106, for parsing and display of the message thread as displayed originally to the forwarding MCD 104. According to certain embodiments, either the WAP Gateway 124 and/or the MMSC Gateway 122 modules of the wireless operator system 102 may facilitate transmitting the flat thread file 402 via the HTTP session 410.

In addition, if the recipient of the forwarded message thread wishes to reply, a reply can be sent to one, more than one, or all of the original thread participants. An SMS reply message without forwarding the original message thread can be sent according to conventional SMS messaging protocol. For example, the SMS client of the MCD 106 may send separate individual SMS reply messages to each recipient or, in another example, the SMS client may send a single reply message and the service operator system 102, such as the SMSC Gateway 120, may replicate the message for delivery to the intended recipients.

However, in one embodiment, the user (or the system) may indicate that the message thread is to be forwarded with the reply. In that instance, the recipient MCD 106 generates a new flat thread file 414 (or supplements the existing flat thread file 402 received to display the original message thread) and transmits it, along with a reply message 416, to the new recipient party or parties in a manner similar to that performed by the original forwarding MCD 104. It is appreciated that the new reply message 416 may be included with the new flat thread file 414, may be a message sent with the new reply message 416, or may be a separate message sent separately. Because a unique thread identifier 406 has now been generated, it can be included with the new flat thread file 414 (such as in the header) to allow the wireless operator system 102 and/or the SMS clients of each of the MCDs 104, 106 to utilize the unique thread identifier 406 for grouping subsequently received messages with the same identifier 406 into a conversation thread.

According to another embodiment, instead of the recipient MCD 106 generating a new flat thread file 414, the wireless operator system 102, such as via the thread forwarding module 140, can retrieve the previously stored 404 original flat thread file 402 and make it available to the new recipient(s) when transmitting the new reply message 416. Thus, upon receipt of the reply message 416 and the new flat thread file 414, the new recipient MCDs 104, 106 can use the unique thread identifier 406 to group and display all of the original messages of the original message thread between the two original participants with all subsequent replies between all of the participants.

In another embodiment, instead of re-capturing the original message thread messages when generating a reply message 416 (or when transmitting a reply by the wireless operator system), a new thread can be started that does not include any of the original message thread messages, but does include any new message that has the unique conversation identifier 406 associated therewith. Thus, the SMS client (or any other programmed logic) can be programmed to identify messages containing the same unique thread identifier 406 and group into a single message thread. In some embodiments, additional message identifiers and/or time stamps can be utilized to facilitate ordering the individual messages within the message thread according to the order received or sent to accurately represent the conversation.

FIG. 4B is a block diagram illustrating an example operational flow 430 of forwarding a message thread from a forwarding MCD 104 to a recipient MCD 106 utilizing MMS messaging protocol. Only those operations that may be different from those performed when using SMS messaging protocol described above are illustrated and described in detail. Upon receiving a command at the forwarding MCD 104 to forward a message thread to one or more recipients, the SMS client of the forwarding MCD 104 generates a flat thread file that contains the message text for each of the individual messages of the message thread and sender identifiers for each of the messages. Upon generating the flat thread file, the SMS client instructs the MMS client of the forwarding MCD 104 to forward the flat thread file 432 to the wireless operator system 102 over the wireless network as an MMS message for delivery to the forwarded recipient MCD(s) 106.

After storing (at least temporarily) the flat thread file 432, and optionally generating the unique thread identifier, the network operator system 102 generates and transmits an MMS control message 434 to the recipient MCD(s) 106, which includes a location identifier (e.g., URI or URL, etc.) of the flat thread file 432. As is typical with MMS protocol, upon receipt of the MMS control message 434, the recipient MCD 106 begins an HTTP session 436 (e.g., via a WAP module) to retrieve the flat thread file 432 based on the location identifier in the MMS control message 434 over the Internet 110 via the wireless network 108. The flat thread file 432 is retrieved 438 from the wireless operator system 102. The flat thread file 432 may then be parsed for display by the MMS client, such as if programmed with a thread forwarding module, or passed to the SMS client if it is programmed with a thread forwarding module. Similar to that described above with reference to FIG. 4A, the recipient MCD 106 may also be operable to reply to one or more of the thread participants and/or forward the message thread with a reply in the same or similar manner using MMS messaging protocol.

In this embodiment, the MMSC Gateway 122 of the service provider system 102, as described with reference to FIG. 1, is operable to receive MMS messages and to facilitate forwarding the flat thread file 432 to the recipient MCD(s) 106. In addition to the MMSC Gateway 122, the Home Agent 130 may be utilized to resolve the identities of the MCDs 104, 106, and the SMSC Gateway 120 may also optionally be programmed to facilitate storing the flat thread file 432, generating the unique thread identifier, and coordinating delivery of the flat thread file 432 to the recipient MCD(s) 106.

FIG. 4C is a block diagram illustrating another operational flow 450 of forwarding a message thread from a forwarding MCD 104 to a recipient MCD 106 utilizing mobile email protocol. Only those operations that may be different from those performed when using SMS messaging protocol described above are illustrated and described in detail. Upon issuing a command to the forwarding MCD 104 to forward a message thread to one or more recipients, the SMS client generates a flat thread file that contains the message text for each of the individual messages of the message thread and sender identifiers for each of the messages. Upon generating the flat thread file, the SMS client instructs the mobile email client of the forwarding MCD 104 to forward the flat thread file 452 to the wireless operator system 102 over the wireless network 108 as a mobile email for delivery to the recipient MCD(s) 106. According to one embodiment, the flat thread file 452 may be associated with an email message as an attachment. In other embodiments, however, the flat thread file 452 may be included as part of the body of the email message.

In this embodiment, upon identifying the email message as containing the flat thread file 452, the flat thread file 452 can be stored locally by the wireless operator system 102 and pushed to 454 (or retrieved based on polling by) email clients of the recipient MCD(s) 106. In addition, a unique thread identifier is generated and associated with the mobile email and flat thread file 452 prior to transmission of the email to the recipient MCD(s) 106.

In embodiments in which the flat thread file 452 is forwarded according to mobile email protocol, the Email Gateway 126 and/or WAP Gateway 124 of the service network operating system 102, as described with reference to FIG. 1, are operable to receive mobile email messages, and to facilitate forwarding the email messages containing the flat thread file 452 to the recipient MCD(s) 106. In addition to the Email Gateway 126 and/or WAP Gateway 124, the Home Agent 130 may be utilized to resolve the identities of the MCDs 104, 106, and the SMSC Gateway 120 may also optionally be programmed to facilitate storing the flat thread file 452, generating the unique thread identifier, and coordinating delivery of the flat thread file 452 via the Email Gateway 126 and/or WAP Gateway 124 to the recipient MCD(s) 106.

When the recipient MCD 106 identifies the mobile message as containing a flat thread file 452, it is configured to retrieve the flat thread file, parse the contents of the flat thread file, and display the threaded message by the SMS client to the user. For example, in one embodiment, the mobile email client of the recipient MCD 106 includes programmed logic to identify the mobile message as containing the flat thread file 452 (e.g., by header information, containing a unique thread identifier, etc.), and then hands the flat thread file 452 to the SMS client for parsing and displaying. In another example, the SMS client of the recipient MCD 106 may include programmed logic to monitor mobile email messages, attachments, and/or header information and, when identifying one as containing a flat thread file 452, the SMS client retrieves the flat thread file from the mobile email client and performs the parsing and display. In yet another embodiment, the mobile email client may include programmed logic to save any flat thread files 452 to a predefined location in memory upon receipt. The SMS client in this example will also include programmed logic to monitor that location in memory and, when a new flat thread file 452 is saved thereto, the SMS client retrieves the flat thread file 452, and parses and displays the message thread on the MCD 106. Communication calls between the mobile email client, the SMS client, the MMS client, and/or memory locations as discussed herein may be performed according to any number of operations, such as, but not limited to, calls or application programming interface ("API") calls between the modules. Similar to that described above with reference to FIG. 4A, the recipient MCD 106 may also be operable to reply to one or more of the thread participants and/or forward the message thread with a reply in the same or similar manner using mobile email protocol.

Figure 5:
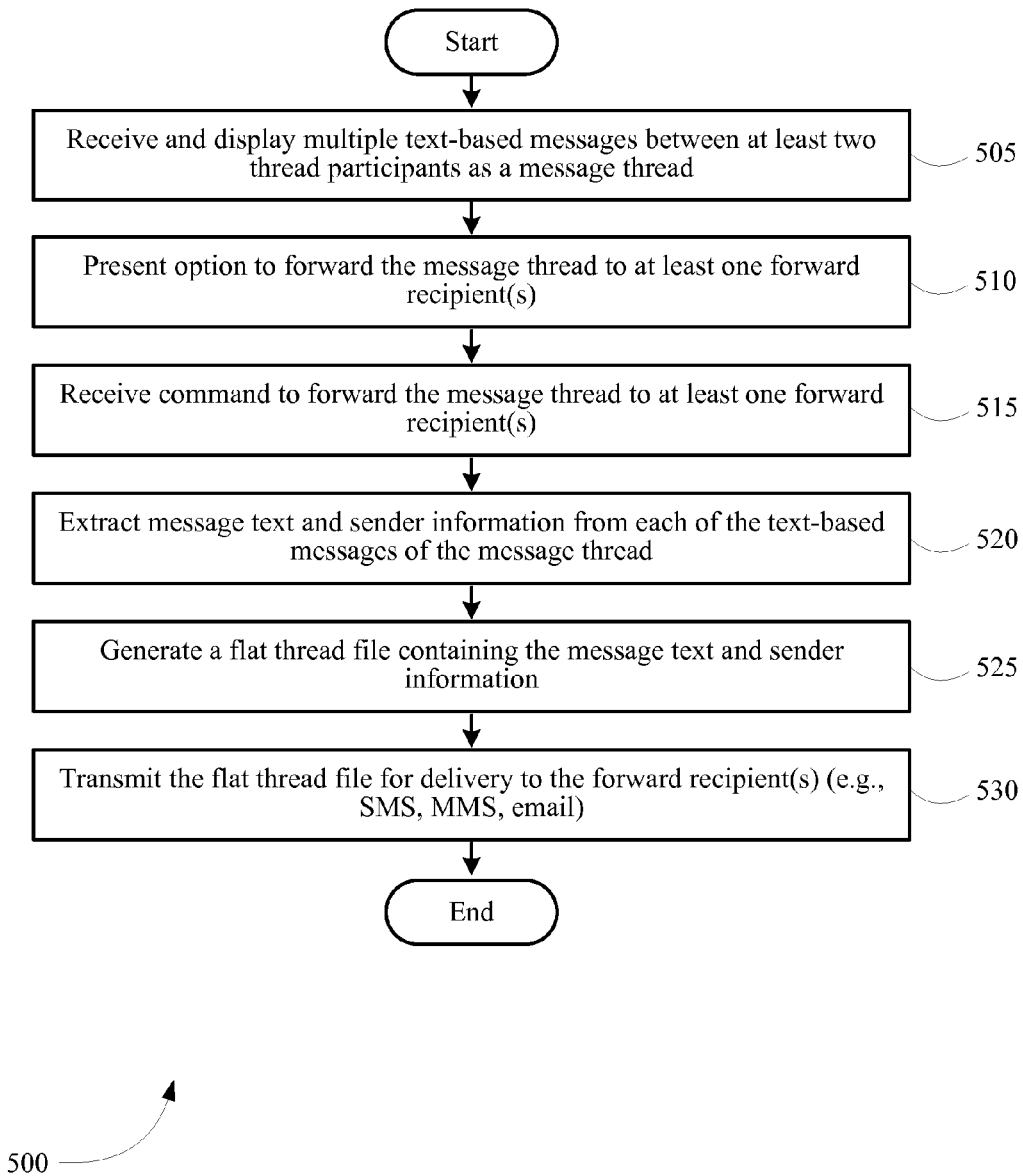
FIG. 5 is a flow diagram of an example method for forwarding a message thread from a mobile communications device, according to an example embodiment of the invention.
Figure 6:
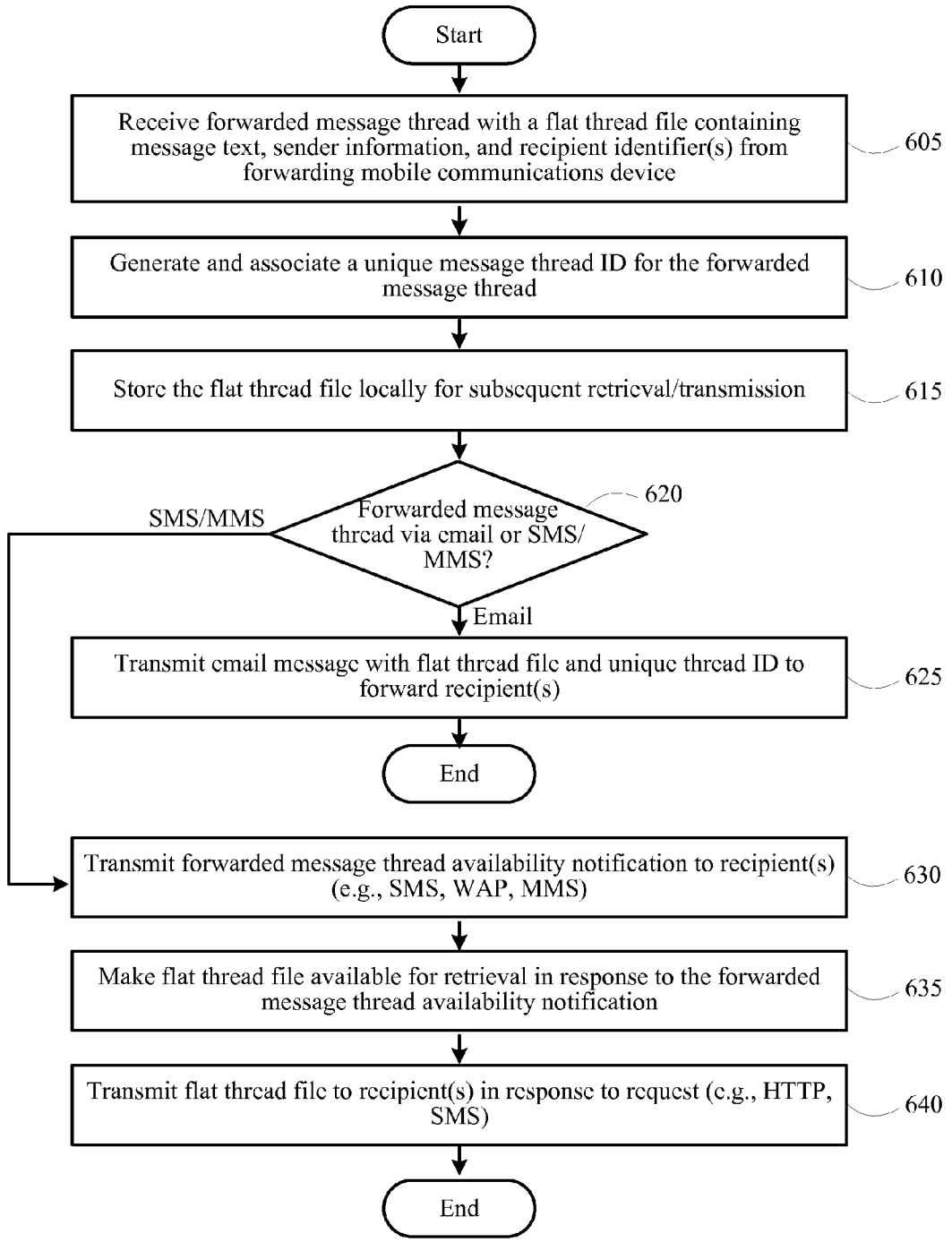
FIG. 6 is a flow diagram of an example method for forwarding a message thread at a wireless operator system, according to an example embodiment of the invention.
Figure 7:
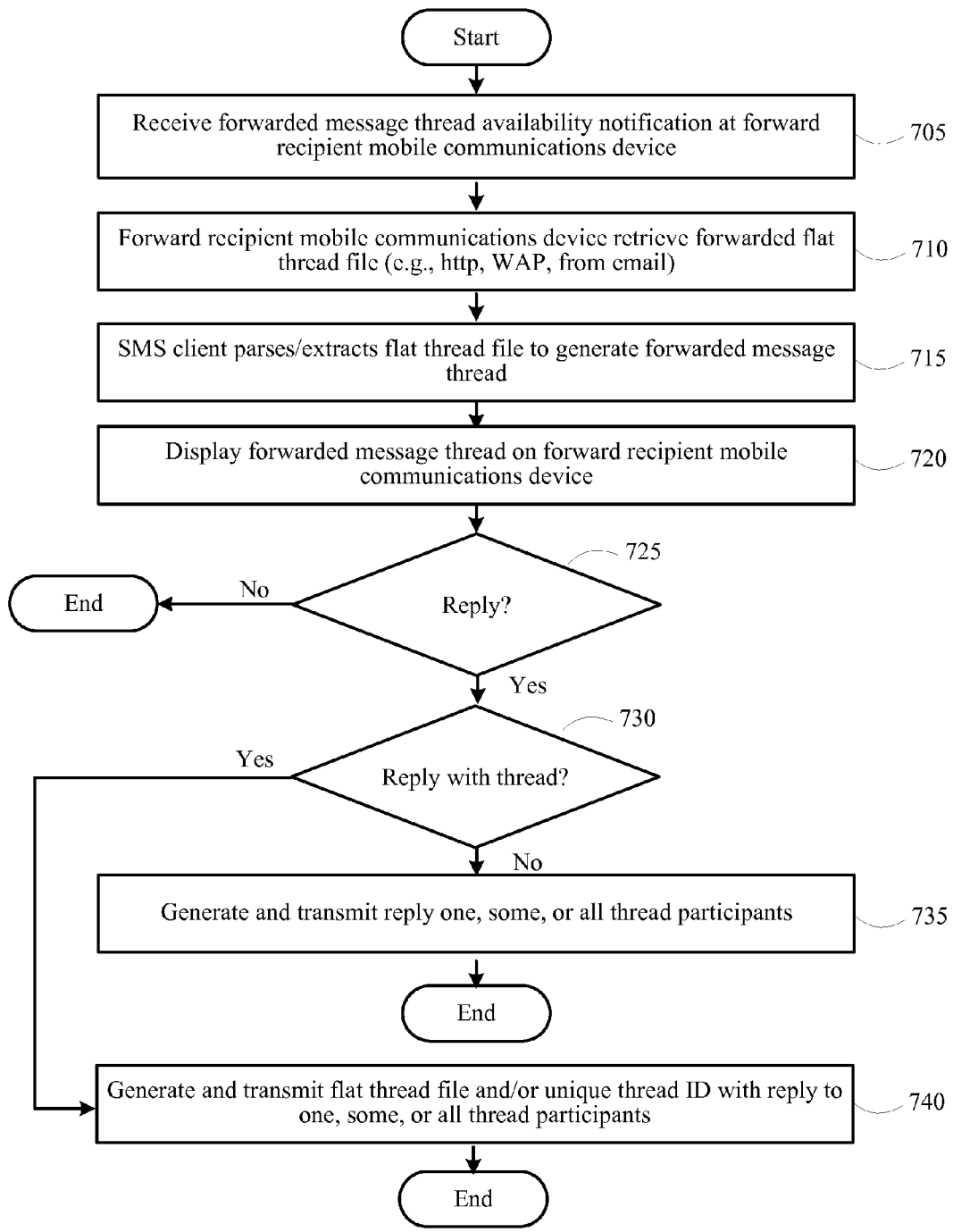
FIG. 7 is a flow diagram of an example method for receiving a forwarded message thread, according to an example embodiment of the invention.

FIGS. 5-7 represent flow diagrams of example methods 500, 600, 700 for forwarding message threads and, optionally, responding thereto, according to example embodiments. The operations of these methods 500, 600, 700 reflect the various data flows illustrated by example in FIGS. 4A-4C, which are to be referenced for additional detail pertaining to these methods.

FIG. 5 illustrates a flow diagram of an example method 500 for forwarding a message thread by a forwarding party's MCD 104, according to one embodiment. As described, the method may be performed, at least in part, by one or more of the SMS client, the MMS client, and/or the mobile email client of the forwarding MCD 104, which may include programmed logic, such as a thread forwarding module, for implementing, at least in part, the operations of the method 500.

The method 500 may begin at block 505, in which the forwarding party's MCD 104, which is utilized to carry on an text-based conversation with another MCD, displays a message thread containing multiple messages between the original two thread participants. An example message thread may be provided as follows:

```
[4:00PM, 1/1] Me: hello?
[4:01PM, 1/1] Stan: Yes?
[4:02PM, 1/1] Me: Just checking in on you
[4:04PM, 1/1] Stan: No prob - AOK here
```

At block 510, the MCD 104 is operable to present, via a user interface, an option to the user to forward the message thread to another party who is not one of the original two thread participants. The option may be presented according to any number of suitable techniques, including, but not limited to, a menu-based option, a hard keyed option, and the like. As part of the option, the user interface will allow for entry or selection of one or more forwarded recipients to receive the message thread. These may be keyed in or selected from existing data, such as from a menu or from contacts data stored in memory.

At block 515, the MCD 104 receives a command by the user to forward the message thread to the one or more thread recipients. As discussed above with reference to FIGS. 4A-4C, the MCD 104 may be adapted to transmit the forwarded message thread using SMS protocol, MMS protocol, or mobile email protocol. At block 520, upon receiving the instructions to forward the message thread, the MCD 104, such as via the SMS client, extracts the message text and message sender identifiers (e.g., phone number, International Mobile Subscriber Identity, etc.) from each of the individual text messages of the message thread. Additional information can also be extracted, according to some embodiments, such as, but not limited to, time and/or dates (e.g., time/date stamp), message identifiers, nicknames or aliases, and the like. At block 525, a flat thread file is generated that contains the message text and sender identifier information, and, optionally, any additional information extracted at block 520. Any number of file formats for creating the flat thread file 402 can be utilized, such as, but not limited to, text files, comma separated files, XML files, WML files, and the like.

Following block 525 is block 530, in which, after generating the flat thread file and obtaining the recipient(s) identifier(s), the forwarding MCD 104 transmits the flat thread file to the wireless operator system 102 over the wireless network 108 for delivery to each of the identified recipient MCD(s) 106. As described, the flat thread file may be attached, included in, or otherwise associated with an SMS message, an MMS message, or a mobile email, according to various embodiments.

In addition, according to some embodiments, the SMS, MMS, or email message generated at block 530 may further include adapted header information that contains an indicator associated with a forwarded message thread (e.g., the flat thread file). For example, the SMS client, MMS client, or mobile email client may add a "Thread ID" (also referred to as "Conversation ID") field to the message header that can be used by the service provider system 102 and subsequent message recipient MCD(s) 106 to indicate that a forwarded message thread is attached or otherwise available. In one embodiment, when initially forwarding the message thread from the forwarding MCD 104, the value associated with the Thread ID field is left blank (or to a default value), leaving the generation and population of the actual unique thread identifier to the service provider system 102. Even with a blank Thread ID field value, the service provider system will be able to identify the incoming SMS, MMS, or mobile email message as containing a flat thread file for forwarding to one or more recipient MCDs 106. In another embodiment, however, the Thread ID field value may be initially populated by the MCD 104. The field value may be automatically generated by the MCD 104 or may be supplied by the user. According to this example embodiment, the wireless operator system 102 may replace the initial Thread ID field value or may retain and utilize and/or supplement the Thread ID field value as the unique thread identifier. It is appreciated that, according to other embodiments, any other suitable techniques for identifying that the SMS, MMS, or mobile email message transmitted from the forwarding MCD 104 includes a forwarded message thread may be utilized, such as, but not limited to, a status indicator, other header field value or values, content supplied in the body of the flat thread file, content supplied in the body of the SMS, MMS, or mobile email message, and the like. An example SMS header including a blank Thread ID field may be provided as follows:

```
From: 4041234567
To: 4045556666
Alphabet: ISO|GSM|UCS-2|binary
UDH: true
SMSC: 4041234567
Provider Queue: ABC
Report: 0
Autosplit: 0|1|2|3
Thread ID : [blank]
```

An example MMS header including a blank Thread ID field may be provided as follows:

```
x-mms-message-type: m-retrieve-conf
x-mms-transaction-id: text-string
x-mms-version: 1.0
message-ID: text-string
thread-ID: [blank]
To: 4045556666
From: 4041234567
```

Finally, a mobile email header including a blank Thread ID field may be provided as follows:

```
Received: from mc2-g7.dept01.provider.com ([65.52.123.13]) by mc2-i9.dept01.provider.com with ProviderA SMTPSVC(2.0.5325.4905); Fri, 1 Jan YEAR 18:03:09 -0700
Received: from provider.com ([87.098.207.243]) by mc2-g7.dept01.provider.com with ProviderA SMTPSVC(2.0.5325.4905); Fri, 1 Jan YEAR 18:01:39 -0700
From: <jane@abcmail.net.com>
Subject: Adv: ?????????
Date: Fri, 1 Jan YEAR 18:09:39
Message-Id: <123.247311.9865774@provider.com>
Mime-Version: 1.0
Content-Type: text/plain; charset="us-ascii"
Bcc:
Return-Path: jane@abcmail.net.com
X-OriginalArrivalTime: 1 Jan YEAR 01:01:42.0196 (UTC)
FILETIME=[2B950740:01C23509]
Thread-ID: [blank]
```

Accordingly, the method 500 may end after block 530, having extracted message content, generated a flat thread file, and forwarded the flat thread file via an SMS, MMS, or mobile email message to a wireless operator system 102 for forwarding to one or more forwarding recipients.

FIG. 6 illustrates a flow diagram of an example method 600 performed by a wireless service operator system 102 for forwarding a message thread to one or more recipient MCDs 106 upon receipt from a forwarding party's MCD 104, according to one embodiment. As described, the method may be performed, at least in part, by one or more of the SMSC Gateway 120, an MMSC Gateway 122, a WAP Gateway 124, an Email Gateway 126, an Intercarrier Gateway 128, and a Home Agent 130 of the wireless operator system 102, which may include programmed logic, such as a thread forwarding module 140, each described with reference to FIGS. 1-2, for implementing, at least in part, the operations of the method 600.

The method 600 may begin at block 605, in which the service operator system 102 receives a message containing a flat thread file for forwarding to one or more recipient MCDs 106. As discussed, the message may be an SMS message, an MMS message, or a mobile email message, according to various embodiments. At block 610, the wireless operator system 102 identifies the SMS, MMS, or mobile email message as containing a flat thread file, and generates a unique thread identifier to associate with the forwarded message thread. According to one embodiment, the wireless operator system 102 can identify the message as containing a flat thread file by the presence of a Thread ID field in a message header, whether initially populated with a unique identifier or not, as described with reference to FIG. 5. In another embodiment, the wireless operator system 102 may include programmed logic to analyze the content of the message and/or attachment received to identify that the message does include a flat thread file for forwarding to one or more recipient MCDs 106. As previously discussed, in some embodiments, the service provider system 102 may not generate and associate a unique thread identifier, such as when subsequent threading based on a forwarded message is not to be supported utilizing a thread identifier or if one is already generated (e.g., by the forwarding MCD 104, etc.). Following block 610 is block 615, in which the wireless operator system 102 stores the flat thread file locally for subsequent delivery to the intended recipient MCD(s) 106. The wireless operator system 102 may store the flat thread file temporarily just for initial delivery to the recipient MCD(s) 106, or it may persist the flat thread file, such as if it can be utilized to re-forward the message thread when replying or when adding yet additional recipients as thread participants.

At decision block 620, the it is determined whether the wireless operator system 102 is to transmit the flat thread file utilizing SMS, MMS, or mobile email protocol. In one embodiment, the wireless operator system 102 is configured to utilize the same protocol by which the forwarded message was received from the forwarding MCD 104. Though, in other embodiments, the wireless operator system 102 may be configured to utilize a different protocol to forward the flat thread file. As one example, the wireless operator system 102 may be configured to always forward the flat thread file via MMS protocol when receiving a forwarded flat thread file as an SMS or an MMS message. Additional details of the operations performed according to these different protocols are described with reference to FIGS. 4A-4C above.

If forwarding the flat thread file as a mobile email, such as if the original forwarded message was received as a mobile email at block 605, then block 625 follows in which the unique thread identifier is associated with the mobile email containing the flat thread file, and the email message is forwarded to the recipient MCD(s) 106. As discussed above, the flat thread file may be attached to a mobile email message as an attachment, or it may be included in the body of the email. This can depend upon how it is received from the forwarding MCD 104. At this point, the unique thread identifier defined in block 610 is also associated with the email message, such as in the header of the email message, as described with reference to FIG. 4C. Upon receipt of the email message, the recipient MCD 106 will process the flat thread file for displaying the forwarded message thread as described with reference to FIG. 7 below.

If forwarding the flat thread file as an SMS message or an MMS message, then blocks 630-640 follow. At block 630, a thread availability notification message is transmitted to the recipient MCD(s) 106, which identifies a location (e.g., URI or URL) of the flat thread file stored at the wireless operator system 102. If being forwarded as an SMS message, this availability notification may be sent as a typical SMS message, a silent SMS message which is not noticed by the user of the recipient MCD 106 but handled by the modified SMS client automatically, or a WAP push message. If being forwarded as an MMS message, the thread availability notification message may be a conventional MMS control message sent to the MCD 106 with a URI or URL link to the stored flat thread file. At blocks 635-640, the wireless operator system 102 allows retrieval of the flat thread file by the recipient MCD(s) 106, such as by an HTTP session initiated by the MCD 106.

Accordingly, the method 600 may end after blocks 625 or 640, having facilitated forwarding a message thread to one or more recipient MCDs 106 as a flat thread file associated with an SMS, MMS, or mobile email message.

FIG. 7 illustrates a flow diagram of an example method 700 performed by one or more recipient MCDs 106 for receiving a forwarded message thread and, optionally, replying or forwarding the message thread, according to one embodiment. As described, the method may be performed, at least in part, by one or more of the SMS client, the MMS client, and/or the mobile email client of the recipient MCD 106, which may include programmed logic, such as a thread forwarding module, for implementing, at least in part, the operations of the method 700.

The method 700 may begin at block 705, in which the recipient MCD 106 receives a thread availability notification from the wireless operator system 102. As described with reference to FIG. 6, if the forwarded thread is being sent associated with an SMS or MMS message, a notification message is initially transmitted to the recipient MCD 106, after which the MCD 106 is to retrieve or download the flat thread file from the wireless operator system 102. Thus, for messages being sent according to SMS or MMS protocol, a flat thread file is not transmitted therewith. However, when the flat thread file is being forwarded with a mobile email message, then the availability notification received at block 705 may be the actual email message and the flat thread file may be attached, embedded, or otherwise associated therewith such that the MCD 106 is not required to perform a separate download.

Following block 705 is block 710, in which the recipient MCD 106 retrieves the flat thread file. If the thread availability notification is being sent via SMS or MMS, the recipient MCD 106 initiates an HTTP session with the wireless operator system 102 over the Internet 110 via the wireless network 108, such as by utilizing a WAP browser of the MCD 106. If the thread availability notification is sent as a mobile email message, then the MCD 106 simply retrieves the flat thread file from within the email message (e.g., from an attachment or from within the body) at block 710. In one embodiment, the SMS client of the recipient MCD 106 includes programmed logic to perform the retrieval of the flat thread file, such as to initiate the HTTP session utilizing the WAP browser module, or to retrieve the flat thread file from the mobile email client. In other embodiments, however, the MMS client and/or the mobile email client may be configured with programmed logic to perform the retrieval of the flat thread file.

Following block 710 is block 715, in which the recipient MCD 106 parses and extracts or otherwise obtains or retrieves the flat thread message file. According to one embodiment, the SMS client is configured with programmed logic to perform the parsing and extraction of the message thread content from the flat thread file. In one example, the SMS client accesses the flat thread file, such as after downloaded by the WAP browser, or upon transmission from the MMS client and/or the mobile email client. After the SMS client obtains the flat thread file, it executes programmed logic to analyze and parse the data which extracts message text and sender information. Extracting the message text and sender information allows displaying the flat thread file on the display of the recipient MCD 106 at block 720 which represents the same/similar message thread as forwarded by the forwarding MCD 104. In one embodiment, if a new message having message text was generated and forwarded with the flat thread file from the forwarding MCD 104, it can be appended to the message thread at block 720 for display as the final message in the displayed message thread. In other embodiments, some or all of the retrieval, parsing, and/or extracting may be performed by other MCD 106 modules, such as by the MMS client and/or the mobile email client.

Following block 720 is decision block 725, in which it is determined whether the recipient wishes to reply to the forwarded thread. A reply can be sent to one, more than one, or all of the original thread participants. In addition, a reply can further allow forwarding the original message thread to allow continued display of the message thread in its entirety. If the recipient does not wish to reply at block 725, then the method may end. However, if the recipient does wish to reply, then decision block 730 follows. At decision block 730, it is determined whether the reply is to include the message thread. This determination may be based on the programmed logic of the MCD 106, or it may be determined by the user. For example, according to one embodiment, the system may be configured such that the original message thread is not forwarded with a reply, and any subsequent messages begin a new message thread, which can be grouped according to the unique thread identifier. In another embodiment, the system may be configured so the original message thread may always be forwarded with a reply to allow re-creating the original message thread and including all subsequent messages in the same original message thread. In yet another embodiment, the system may be configured so that only the unique thread identifier is transmitted with the reply message, which may allow only messages subsequent to the generation of the unique thread identifier to be grouped in a new message thread, or may allow retrieving and forwarding the original message thread from the wireless operator system 102 to re-create the original message thread and all subsequent messages.

Accordingly, if at block 730, no thread is to be forwarded, then block 735 follows. At block 735, an SMS reply message without the original message thread can be sent to one or more recipients according to conventional SMS messaging protocol. For example, if replying to both of the original thread participants (at this point there would be two, but during subsequent correspondence there may be more), the SMS client of the MCD 106 may send separate individual SMS reply messages to each recipient or, in another example, the SMS client may send a single reply message and the wireless operator system 102, such as the SMSC Gateway 120, may replicate the message for delivery to the intended recipients.

However, if at block 730, it is determined that the message thread is to be forwarded to re-create the original message thread, then block 740 follows. At block 740 the flat thread file that is retrieved by the recipient MCD 106 at block 710 can be included with the reply message in the same or similar manner as described with reference to FIG. 5, and the operations associated with forwarding the original message thread can be similarly performed. Thus, the reply message can include the flat thread file so that, upon receipt by the reply recipient MCD(s) 106, the flat thread file can be retrieved, parsed, and display the original message thread in addition to the subsequent replies. In another embodiment, however, instead of the recipient MCD 106 generating a new flat thread file or forwarding the original flat thread file, the wireless operator system 102 can retrieve the previously stored original flat thread file based on the unique thread identifier included in the reply message and make the flat thread file available to the new recipient(s) when transmitting the new reply message.

Otherwise, instead of re-capturing the original message thread messages when generating a reply message, a new thread can be started that does not include any of the original message thread messages, but does include any new message that has the unique thread identifier associated therewith. Thus, the SMS client (or any other programmed logic) of an MCD 104,106 can be programmed to identify messages containing the same unique thread identifier and group them into a single message thread.

The method 700 may therefore end after blocks 725, 735, or 745, depending upon whether a reply message is transmitted and whether a message thread is to be forwarded with the reply message.

Accordingly, the example systems and methods described herein provide the ability to share threaded text-based messages with other MCDs, which have conventionally been restricted to displaying a message thread between two recipients only. However, according to the embodiments described herein, a message thread can be forwarded to a new recipient MCD by generating a flat thread file and forwarding that flat thread file to the recipient MCD. The flat thread file allows the recipient MCD to parse and extract the original message thread contents between the two original thread participants for display on the new recipient's MCD, who could not otherwise participate in the threaded conversation.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that are executed on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that are executed on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forwarding a message thread between mobile communications devices, comprising:
    receiving, by a service provider server comprising one or more computers, a message comprising a thread file associated with a forwarded message thread from a forwarding party mobile communications device, wherein the thread file comprises message text and sender information obtained from each of a plurality of text messages in the forwarded message thread, the plurality of text messages associated with at least two thread participants, and wherein the message identifies at least one new recipient device associated with a new thread participant;
    associating, by the service provider server, a unique thread identifier with the thread file;
    transmitting, by the service provider server to the at least one new recipient device, a notification of the availability of the forwarded message thread;
    in response to transmitting the notification, receiving, by the service provider server, a request for the forwarded message thread from the at least one recipient device; and
    transmitting, by the service provider server, the thread file with the unique thread identifier over a wireless network for delivery to the at least one new recipient device for display of the forwarded message thread.

2. The method of claim 1, wherein the received message containing the thread file comprises one of: (a) a Short Message Service (SMS) message; (b) a Multimedia Message Service (MMS) message; or (c) an email message.

3. The method of claim 1, wherein the notification is transmitted as one of: (a) a wireless application protocol push message; (b) an SMS message; or (c) an MMS control message, containing a location identifier associated with the thread file.

4. A system for forwarding a message thread between mobile communications devices, comprising:
    a wireless operator system comprising at least one memory storing computer-executable instructions and at least one processor operable to execute the computer-executable instructions;
    wherein the at least one processor is operable to execute the computer-executable instructions to:
        receive a message comprising a thread file associated with a forwarded message thread from a forwarding party mobile communications device, wherein the thread file comprises message text and sender information obtained from each of a plurality of text messages in the forwarded message thread, the plurality of text messages associated with at least two thread participants, and wherein the message identifies at least one new recipient device associated with a new thread participant;
        associate a unique thread identifier with the thread file;
        transmit a notification of the availability of the forwarded message thread;
        in response to transmitting the notification, receive a request for the forwarded message thread from the at least one recipient device; and
        transmit the thread file with the unique thread identifier over a wireless network for delivery to the at least one new recipient device for display of the forwarded message thread.

5. A method for forwarding a message thread from a mobile communications device, comprising:
    displaying a plurality of text messages between at least two thread participants on a forwarding party mobile communications device display as a message thread;
    transmitting, by the forwarding party mobile communications device to at least one new recipient mobile communications device associated with a new thread participant, a notification of the availability of the message thread;
    in response to transmitting the notification, receiving, by the forwarding party mobile communications device, an instruction to forward the message thread to the at least one new recipient mobile communications device;
    obtaining, by the forwarding party mobile communications device, message text and sender information for each of the plurality of text messages in the message thread;
    generating, by the forwarding party mobile communications device, a thread file including the extracted message text and sender information for each of the plurality of text messages in the message thread;
    associating a unique thread identifier with the thread file; and
    transmitting the thread file with the unique thread identifier for delivery by the forwarding party mobile communications device to the at least one new recipient mobile communications device for display of the message thread.

6. The method of claim 5, wherein the thread file comprises one of: (a) a comma separated file; (b) a text-based file; or (c) a wireless markup language file.

7. The method of claim 5, wherein transmitting the thread file comprises:
    generating at least one Short Message Service (SMS) message comprising the thread file; and transmitting the at least one SMS message over at least one wireless network for delivery to the at least one new recipient mobile communications device.

8. The method of claim 5, wherein transmitting the thread file comprises:
generating at least one Multimedia Message Service (MMS) message comprising the thread file; and
transmitting the at least one MMS message over at least one wireless network for delivery to the at least one new recipient mobile communications device.

9. The method of claim 5, wherein transmitting the thread file comprises:
generating at least one email message comprising the thread file as an attachment; and
transmitting the at least one email message over at least one wireless network for delivery to the at least one new recipient mobile communications device.

10. The method of claim 5, wherein the thread file is for generating and displaying a forwarded message thread containing the obtained message text and sender information for each of the plurality of text messages on a display of the at least one new recipient mobile communications device.

11. A method for receiving a forwarded message thread at a mobile communications device, comprising:
receiving, by a new recipient mobile communications device associated with a new thread participant, a notification of the availability of a forwarded message thread forwarded from a forwarding mobile communications device;
in response to receiving the notification, sending, by the new recipient mobile communications device, a request for the forwarded message thread to the forwarding mobile communications device;
receiving, by the new recipient mobile communications device, a message comprising (i) a thread file associated with the forwarded message thread and (ii) a unique thread identifier associated with the thread file, wherein the thread file comprises message text and sender information obtained from each of a plurality of text messages in the forwarded message thread, wherein the plurality of text messages are associated with at least two thread participants;
obtaining the message text and the sender information for each of the plurality of text messages from the thread file;
generating the forwarded message thread to include the obtained message text and the sender information for each of the plurality of text messages; and
displaying the forwarded message thread on a display of the new recipient mobile communications device, wherein the forwarded message thread comprises a text message for each of the plurality of text messages in the forwarded message thread.

12. The method of claim 11, wherein the message containing the thread file is downloaded via a hyper-text transfer protocol session over a wireless network.

13. The method of claim 11, further comprising, upon receipt of the message associated with the thread file and prior to obtaining the message text and the sender information, identifying, by the new recipient mobile communications device, that the message contains the thread file.

14. The method of claim 11, wherein receiving the message comprising the thread file comprises one of: (a) a Short Message Service (SMS) message; or (b) a Multimedia Message Service (MMS) message, wherein the method further comprises obtaining the thread file, wherein obtaining the thread file comprises downloading the thread file over a wireless network in response to receiving one of the SMS message or the MMS message.

15. The method of claim 11, wherein the message comprising the thread file further comprises an email message containing the thread file as an attachment received by an email client of the new recipient mobile communications device, and wherein the message further comprises accessing the thread file attachment by a message thread forwarding module to extract the message text and the sender information for each of the plurality of text messages from the thread file.

16. The method of claim 11, further comprising:
presenting, by the new recipient mobile communications device, at least one option to reply to the forwarded message thread;
receiving instructions to reply to the forwarded message thread comprising an identification of at least one reply recipient and reply message text, wherein the at least one reply recipient is a thread participant;
generating a reply message containing the reply message text; and
transmitting the reply message for delivery from the new recipient mobile communications device to a mobile communications device associated with the at least one reply recipient.

17. The method of claim 16, wherein the at least one reply recipient comprises at least one of: (a) the forwarding party; or (b) at least one other thread participant other than the forwarding party.

18. The method of claim 16, wherein the unique thread identifier comprises a first unique thread identifier, and wherein the reply message includes a second unique thread identifier utilized by the at least one reply recipient to group messages containing the second unique thread identifier together to create a message thread for display.

19. A mobile communications device for forwarding a message thread, comprising:
computer-executable instructions and at least one processor operable for executing the computer-executable instructions, wherein the at least one processor is operable to execute the computer-executable instructions to:
display a plurality of text messages between at least two thread participants on the mobile communications device display as the message thread;
transmit, to at least one new recipient mobile communications device associated with a new thread participant, a notification of the availability of the message thread;
in response to transmitting the notification, receive an instruction to forward the message thread to the at least one new recipient mobile communications device;
obtain message text and sender information for each of the plurality of text messages in the message thread;
generate a thread file including the obtained message text and the sender information for each of the plurality of text messages in the message thread;
associate a unique thread identifier with the thread file; and
transmit the thread file with the unique thread identifier for delivery to the at least one new recipient mobile communications device for display of the message thread.

20. A mobile communications device for receiving and displaying a forwarded message thread, comprising:
computer-executable instructions and at least one processor operable for executing the computer-executable instructions, wherein the at least one processor is operable to execute the computer-executable instructions to:

receive a notification of the availability of the forwarded message thread forwarded from a forwarding mobile communications device;

in response to receiving the notification, send, by the new recipient mobile communications device, a request for the forwarded message thread;

receive a message comprising (i) a thread file associated with the forwarded message thread and (ii) a unique thread identifier associated with the thread file, wherein the thread file comprises message text and sender information obtained from each of a plurality of text messages in the forwarded message thread, wherein the plurality of text messages are associated with at least two thread participants;

obtain the message text and the sender information for each of the plurality of text messages from the thread file;

generate the forwarded message thread to include the obtained message text and the sender information for each of the plurality of text messages; and display the forwarded message thread on a display of the mobile communications device, wherein the mobile communications device is associated with a new thread participant, and wherein the forwarded message thread comprises a text message for each of the plurality of text messages in the forwarded message thread.

* * * * *